United States Patent [19]

Guyader et al.

[11] Patent Number: 4,821,314

[45] Date of Patent: Apr. 11, 1989

[54] MESSAGE AND RINGING SIGNALING DEVICE FOR A TELEPHONE INSTALLATION

[75] Inventors: Roger Guyader, Guipavas; Jean-Marie Ploet, Plougastel Daoulas, both of France

[73] Assignee: Telic Alcatel, S.A., Strasbourg Cedex, France

[21] Appl. No.: 86,579

[22] Filed: Aug. 18, 1987

[51] Int. Cl.[4] ...................... H04M 1/00; H04M 19/02
[52] U.S. Cl. .................................... 379/376; 379/253; 379/396
[58] Field of Search ............... 379/376, 373, 396, 215, 379/253, 252, 418, 255, 254, 251, 263

[56] References Cited

U.S. PATENT DOCUMENTS

| | | | |
|---|---|---|---|
| 3,710,032 | 1/1973 | Maw-huei | 379/199 |
| 4,140,882 | 2/1979 | Regan et al. | 379/201 |
| 4,266,101 | 5/1981 | Dussbar | 379/253 |
| 4,506,115 | 3/1985 | Schmitt | 379/376 |
| 4,726,048 | 2/1988 | Waldman et al. | 379/7 |
| 4,726,060 | 2/1988 | Itoh et al. | 379/376 |

FOREIGN PATENT DOCUMENTS

| | | | |
|---|---|---|---|
| 0200773 | 6/1983 | German Democratic Rep. | 379/376 |
| 0190767 | 10/1984 | Japan | 379/253 |
| 0032640 | 2/1986 | Japan | 379/253 |

Primary Examiner—Thomas W. Brown
Attorney, Agent, or Firm—Oblon, Fisher, Spivak, McClelland & Maier

[57] ABSTRACT

Message signaling device for a telephone installation having analog stations and station equipped for this purpose. The invention has as its objects a signaling device by light means for a telephone installation whose subscribers are equipped with analog stations and the stations equipped for this purpose. Each telephone station (4) concerned is equipped in parallel, on the one hand, with a message lamp (59) in series with a resistor (60), on the other hand, with a capacitor (61), coming out of the rectifier bridge (51) of the station. The message signaling is achieved by action of the control unit (3) of the telephone exchange equipment on the injector (36) of ringing signals assigned to the station, so as to cause it to transmit rhythmic signals which differ from the rhythmic ringing signals by the shorter period of the transmission phases of the signal and which make possible the lighting of the lamp.

3 Claims, 1 Drawing Sheet

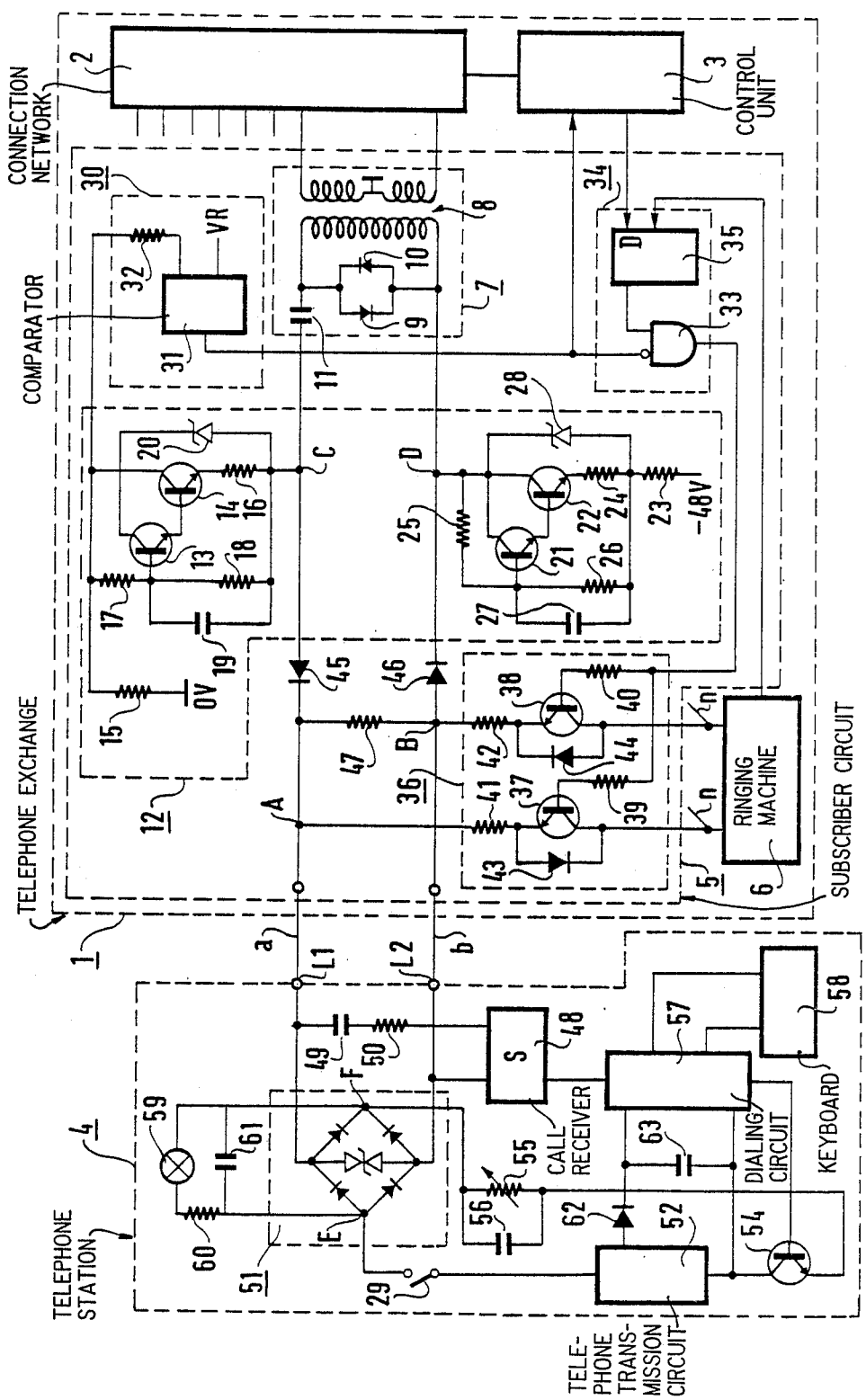

MESSAGE AND RINGING SIGNALING DEVICE FOR A TELEPHONE INSTALLATION

BACKGROUND OF THE INVENTION

1. Field of the Invention:

This invention relates to a message signaling device particularly by light means for a telephone installation whose users are provided with analog stations, as well as telephone stations equipped for this purpose.

2. Description of the Background

As an additional possibility of use favorable to users, private telephone installations tend to have telephone stations equipped with lamps, known as message stations, which make it possible to signal to the user of a station that a message has been received for him, such as use being required, for example, in hotel telephone installations.

A first standard solution with telephone installations whose stations are of the analog type, consists in using lines which have an additional wire providing the lighting of a message lamp. However, such a solution increases the cost in the case of new installations and requires a running of the connecting wiring of the existing installations.

A second standard solution consists in having a particular frequency signal generated by telephone exchange equipment of the installation and in sending this signal to the station concerned. However, here again, the solution is relatively costly.

SUMMARY OF THE INVENTION

The object of this invention is therefore to propose a signaling device for a telephone installation organized around telephone exchange equipment to which telephone stations are connected by telephone lines each comprising two wires, known as conversation wires, which are connected to a station and which provide particularly the transmission of speech audiofrequency signals and/or of data transiting in analog form by this station and the sending to this latter of rhythmic ringing signals, alternating phases of silence with phases of transmission of a determined low frequency signal, these rhythmic signals being provided by a ringing signal generator of the telephone exchange equipment to a call receiver of the station, connected to the conversation wires, at the time of the requests for establishment of communication with the station under consideration.

The proposed signaling device has the objective of being simple to use, effective and inexpensive.

According to a characteristic of the invention, the analog telephone stations with message signaling each comprise message signaling means which include in parallel, on the one hand, a lamp in series with a resistor and, on the other hand, a capacitor, and which are connected to the outputs of the rectifier bridge feeding remotely the station from the telephone line connecting said station to the telephone exchange equipment, and in that the telephone exchange equipment comprises means for controlling the sending by the generator of ringing signals of rhythmic signals whose cyclic transmission phase, shorter than that of the rhythmic ringing signals, is sufficient to light the lamp while being too short to actuate the call receiver.

According to another characteristic of the invention, the message lamp of the analog telephone stations, comprising a message signaling, is connected in series with a resistor and to the terminals of a buffer capacitor itself connected to the output terminals of the rectifier bridge which is fed remotely by the conversation wires of the telephone line connecting it to a telephone installation.

BRIEF DESCRIPTION OF THE DRAWING

The invention, its characteristics and its advantages are specified in the following description, in connection with the single FIGURE.

This single FIGURE diagrammatically represents an example of a signaling device for a telephone installation organized around telephone exchange equipment.

DESCRIPTION OF THE PREFERRED EMBODIMENTS

The subscriber's line telephone exchange equipment for a telephone installation exhibited in the figure consists, for example, of automatic switching equipment or further of a telephone exchange box of an intercom installation.

This telephone exchange equipment 1 essentially comprises a connection network 2, which is controlled by a control unit 3, organized for example around a usual processor, not shown.

Connection network 2 makes it possible to connect to one another telephone stations which are connected to it by individual subscriber circuits serving as adaptation interfaces.

Each telephone station, such as station 4 in FIG. 1, is connected to its subscriber circuit 5 by a telephone line requiring only two wires "a, b", which are those traditionally called conversation wires.

In the telephone stations connected to their respective subscriber equipment by a two-wire line, these latter provide bidirectional transfer, in low frequency analog form or by change of state, of the group of signals transiting from the telephone station to the telephone exchange equipment to which these wires are connected.

Although the invention described below is presented in conjunction with a telephone station 4 having two wires "a, b,", it should be specified that it is also applicable to any station or terminal comprising additional wires, such as for example a station having an additional ground wire, or to a station or terminal having two telephone lines.

To the extent that the invention relates essentially to subscriber stations and circuits to which are connected the structures of connection network 2, of control unit 3 and of auxiliary equipment essential to the functioning of the telephone exchange equipment 1, which are known, will not be mentioned. An exception will be made, however, for the auxiliary equipment that constitutes a ringing machine, this machine, here referenced 6, being connected to subscriber circuits 5 to provided them with a very low frequency alternate signaling, for example, twenty-five hertz, at relatively high voltage, for example, eighty effective volts, known as ringing, serving to warn the users of the stations of the calls which are intended for them.

In the example proposed, ringing machine 6 is a usual static alternating generator with terminals to which are connected in parallel subscriber circuits 5 of the telephone exchange equipment, only one of these circuits being exhibited in figure 1.

Each subscriber circuit 5 is traditionally connected, on the one hand, to conversation wires "a, b", of station 4 that it serves, via connection terminals L1, L2 of this station, on the other hand to an individual access of the switching network 2 by two wires ending at a translator 7.

Translator 7 is traditionally constituted around a transformer 8 connected, on the one hand, to two connection network access wires via a first winding at midpoint to the ground, on the other hand, to the two conversation wires "a, b,", via a second winding between the terminals from which two antiovervoltage diodes 9, 10 are traditionally mounted head to foot.

A capacitor 11 placed on wire "a", blocks any possible continuous component at the level of the translator.

A feeder 12 traditionally provides the application of voltage of the conversation wires "a, b", at various potentials, for example, zero volts for the first and minus forty-eight volts for the second so as to make possible the detection of the closing of the loop which connects wires a and b to the inside of the station, when this latter is in operation.

Feeder 12 here is composed of two parts, one connects wire "a", to the zero volt potential by a Darlington connection having two transistors 13, 14, of NPN type, in cascade. These transistors are connected to the zero volt potential by their collectors, via a resistor 15, and to wire "a", via a resistor 16 connected to the emitter of resistor 14 placed downstream from the connection. The base of transistor 13 placed upstream is connected to the common point between two resistors 17 and 18 forming a dividing bridge connected, on the one hand, to wire "a", and, on the other hand, to the zero volt potential, via resistor 15. A capacitor 19 placed at the terminals of resistor 18 and a Zener diode 20, placed between the collector of downstream transistor 14 and wire "a,", complete the connection part connected to the zero volt potential. The second part of feeder 12 connects wire "b", to the −48 volts potential. This second part is composed in a manner identical with the first by a Darlington connection having two transistors 21, 22 in cascade which corresponds to transistors 13, 14, for resistors 23, 24, 25 and 26, a capacitor 27 and a Zener diode 28 perform respectively the same role as resistors 15, 16, 17, 18, capacitor 19 and Zener diode 20.

Feeder 12 thus constituted feeds the line with direct current under forty-eight volts through two resistors of three hundred ohms apparent value, it exhibits a high impedance with respect to audiofrequency signals so as not to weaken them during their transmission.

The continuous feeding of the line formed by wires a, b makes possible the detection of the loop openings and closing at the level of telephone station 4 as indicated above.

The loop opening and closing are traditionally caused by a contact 29, known as a hookswitch, which is controlled by the hanging up or lifting of the handset, not shown here, of station 4, during the use of this station.

According to a standard process, the loop closing is detected by a detector 30, known as a loop detector, of the subscriber circuit.

This loop detector 30, for example, consists of a comparator 31 connected by its inputs, on the one hand, to a reference potential VR by a first input, on the other hand, to feeder 12 by a second input, via a resistor 32.

Resistor 32 here is connected at the common point to resistor 15, to resistor 17 and to the collectors of transistors 13, 14. The output of comparator 31 signals in binary form any significant supply of current into the feeder, or here the passage of a current greater than eight milliamperes.

The output signal of comparator 31 is supplied, on the one hand, to control unit 3 of the telephone exchange equipment, on the other hand, to an inverted input of a gate 33, of the AND type, of a ringer injection control circuit 34 which this signaling blocks so as to prohibit the sending of a ringer current to station 4 when this latter is in communication, i.e., when its loop is closed.

On the other hand, the sending of a ringer current is possible, on the control of telephone exchange unit 3 and on demand of another station, when loop detector 30 indicates that the loop is open, not blocking gate 33. Injection control circuit 34 comprises for this purpose a flip-flop 35 having an output acting on the second input of gate 33 and including a pair of inputs receiving a ringer trigger signal emanating from control unit 3, via a connection applied to a data input D, and a clock signal from the ringer machine 6 which clocks the flip-flop 35 when the voltage signal from the ringer machine 6 drops.

An injection circuit 36 of subscriber circuit 5 receives the commands supplied in binary form by gate 33.

This injection circuit 36 here comprises two switching transistors 37 and 38, the first of NPN type, the other of PNP type, which are connected the first by its collector, the other by its emitter at the terminals of ringing machine 6 which applies to them in a continuous manner the alternate low frequency ringer signals, polarized here at forty-eight volts.

Bases of transistors 37 and 38 are connected to the output of gate 33, via two resistors 39, 40 for a simultaneous switching of these transistors.

The alternate ringer signals are transmitted to wires a and b by two resistors 41, 42, the first connected between wire b and the emitter of transistor 37, the other connected between wire a and the collector of transistor 38. Two diodes 43, 44 are each connected in parallel to the emitter-collector connection of one of transistors 37, 38 to protect them; two diodes 45, 46 are each placed on a line wire between points A, B where injection circuit 36 is connected and points C, D where feeder 12 is connected so as to prevent the appearance of high voltages at the terminals of this latter, during injection phases.

The ringer current, supplied by subscriber circuit 5 to station 4 is normally received by a call receiver 48 connected to line wires a, b. This call receiver 48 is, for example, a standard ringer or an electronic circuit having the same function; it is connected, on the one hand, via a capacitor 49 and a resistor 50, to wire a, on the other hand, directly to wire b, in parallel with a diode rectifier bridge 51 assuring the remote feeding of station 4 and the bidirectional transmission of the conversation signals to and from a standard telephone transmission circuit 52.

Telephone transmission circuit 52 traditionally serves at least one microphone and an earpiece or speaker not shown, it is connected to outputs E, F of the diagonal fed from bridge 51, on the one hand, by the hookswitch contact 29 signaling the putting into service of the station by unhooking of the handset or the equivalent, on the other hand, by a switching transistor 54, here of NPN type, in series with a modifiable resistance regulating circuit 55 and capacitor 56 in parallel.

Switching transistor 54 here is controlled, via its base, by a dialing circuit 57 charged with assuring the loop closings and openings corresponding to the figures tabulated on a keyboard 58, the dialing circuit and the keyboard being fed by rectifier bridge 51, via transmission circuit 52.

According to the invention, a message lamp 59 is simply associated with a decoder, formed in parallel of a resistor 60 in series with the message lamp and of a capacitor 61, the unit is connected to outputs (E, F) of rectifier bridge 51.

In a selected embodiment, resistor 60 and capacitor 61, for example, have respective values of 47 kilo ohms and 22 microfarads while resistor 50 and capacitor 49 have respective values of 330 ohms and 2.2. microfarads, the lamp being a 60-volt neon lamp.

Signaling the presence of a waiting message at a station such as 4, consists in causing ringer signals to be emitted by the injection circuit that are too short to engage the call receiver circuit 48 of the station, but sufficient to light the message lamp and charge capacitor (61) whose slow discharge keeps the lamp lit during phases of silence still to be injected with message signals. If, for example, the ringer signals correspond to a cyclic injection of 1500 milliseconds followed by a phase of silence of 3500 milliseconds, the message signals correspond, for example, to a cyclic injection of 64 milliseconds followed by a phase of silence of one second.

The control of lighting of message lamp 59 can be performed by any means making it possible to supply an order in this sense in coded binary form to control unit 3 programmed to achieve it. This order which comprises a command and an indication of the station concerned, can be sent by various means, for example, from an operator's station in the case of a automatic switching equipment or else from a screen station and keyboard or even from a simple telephone station with buttons, provided for this purpose.

Control unit 3 controls injection circuit 36 in a similar way for the sending of a ringing ringer or of a message indication, the essential difference being the injection period that control unit 3 establishes, thanks to an internal counter cyclically restarted for the period of transmission of the message. The command for turning off of a message lamp 59 is obtained by a process similar to the one described for lighting.

Of course, the presence of a lit message lamp in no way disturbs the normal operation of the station. In particular, the picking up of the handset of a station, whose message lamp is lit, eliminates this lighting for at least the period of this unhooking, under the action of the loop detector 30 which inhibits injection circuit 36 via gate 33, just as if the station had rung.

As a variant, a ringing message signaling can also be made by the above-mentioned process with a standard ringer telephone station, the rhythmic message signal applied to the conversation wires making it possible to cause the ringer to ring softly without a real ringing signaling going off.

What is new and desired to be secured by Letters Patent of the United States is

1. A signaling device for a telephone installation organized around a subscriber's line telephone exchange equipment (1) to which telephone stations (4) are connected by lines each comprising at least two wires, known as conversation wires (a,b) which, connected to a station, provide particularly the remote feeding of the station via a diode rectifier bridge (51), and the transmission of audiofrequency signals transiting in analog form by this station and the sending of rhythmic ring tones, alternating phases of silence with phases of transmission of a determined low frequency signal by a ringing generator (6, 36) of the telephone exchange equipment to a call receiver (48) of the station, said device being characterized in that it comprises, on the one hand, in each of stations (4) concerned, message signaling means which include, in parallel, on the other hand, a lamp (59) in series with a resistor (60) and on the other hand, a capacitor (61) and which are connected to outputs (E, F) of the rectifier bridge (51), and, on the other hand, in the telephone exchange equipment, means to control, by the ringing generator, the sending of rhythmic signals whose cyclic transmission phase, shorter than that of the rhythmic ringing signals, is sufficient to light the lamp while being too short to actuate the call receiver.

2. A message signaling device according to claim 1, for a telephone installation in which the telephone exchange equipment (1) comprises a ringer injector (36) connected to the conversation wires of the line serving said station, which is fed with rhythmic ringing signals by a common ringing machine (6) of the telephone exchange equipment, and which is controlled selectively in transmission by a control unit (3), via an injection control circuit (34), said device being characterized in that the transmission of the rhythmic message signals to the station is controlled by the control unit (3) of the telephone exchange equipment, via the injection control circuit (34) serving the station concerned, said injection control circuit receiving cyclic transmission commands whose individual period is shorter than that of the ringer signals.

3. An analog telephone station connected to a subscriber's line telephone exchange equipment by means of a pair of conversation wires and equipped with a capability to provide message signaling, comprising:

a call receiver connected to said conversation wires and actuated upon application of rhythmic signals having a predetermined minimum cyclic transmission phase to said conversation wires by said telephone exchange equipment;

a rectifier bride having inputs connected to said conversation lines and outputs; and a message lamp connected in series with a resistor, and a capacitor connected in parallel with said lamp and said resistor and in parallel with the outputs of said rectifier bridge, wherein said lamp is actuated to emit light upon application to said conversation wires by said telephone exchange equipment of rhythmic signals having a cyclic transmission phase shorter than said predetermined minimum cyclic transmission phase necessary to actuate said call receiver, whereby said lamp is actuable by means of rhythmic signals having a cycle transmission phase too short to actuate said call receiver.

* * * * *